2 Sheets—Sheet 1.

B. H. CATCHING.
MACHINE FOR SAWING STAVES.

No. 182,102.       Patented Sept. 12, 1876.

WITNESSES:
H. Rydquist.
John Goethals

INVENTOR:
B. H. Catching
BY
[attorney signature]
ATTORNEYS.

2 Sheets—Sheet 2.

B. H. CATCHING.
MACHINE FOR SAWING STAVES.

No. 182,102. Patented Sept. 12, 1876.

WITNESSES:

INVENTOR:
B. H. Catching
BY
ATTORNEYS.

UNITED STATES PATENT OFFICE.

BENJAMIN H. CATCHING, OF FOREST GROVE, OREGON.

IMPROVEMENT IN MACHINES FOR SAWING STAVES.

Specification forming part of Letters Patent No. 182,102, dated September 12, 1876; application filed May 27, 1876.

*To all whom it may concern:*

Be it known that I, BENJAMIN H. CATCHING, of Forest Grove, Washington county, Oregon, have invented an Improvement in Machines for Sawing Staves, of which the following is a specification:

This improved machine consists of a band-saw; or it may be a saw of similar form in two parts, fitted on an oscillating circular head, on each side of which is a saw-table and feed-carriage, the carriages being worked by weighted cords, and the saw-tables have grooves in the under side for gaging the work to the saw, the guide being shifted from groove to groove as each stave is sawed off.

The contrivance makes a very simple and efficient machine, a special advantage of which is that one part of the saw cuts while the other part is on the back stroke—a feature not to be found in ordinary reciprocating machines.

Figure 1:
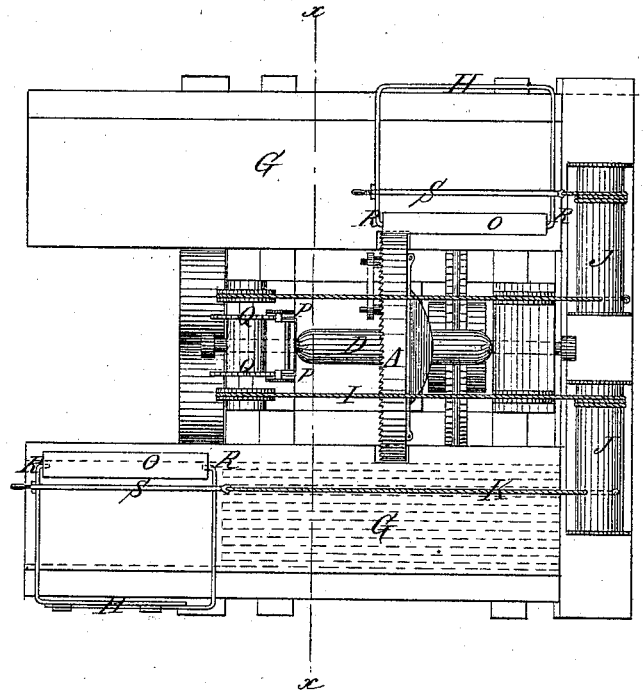
Figure 2:
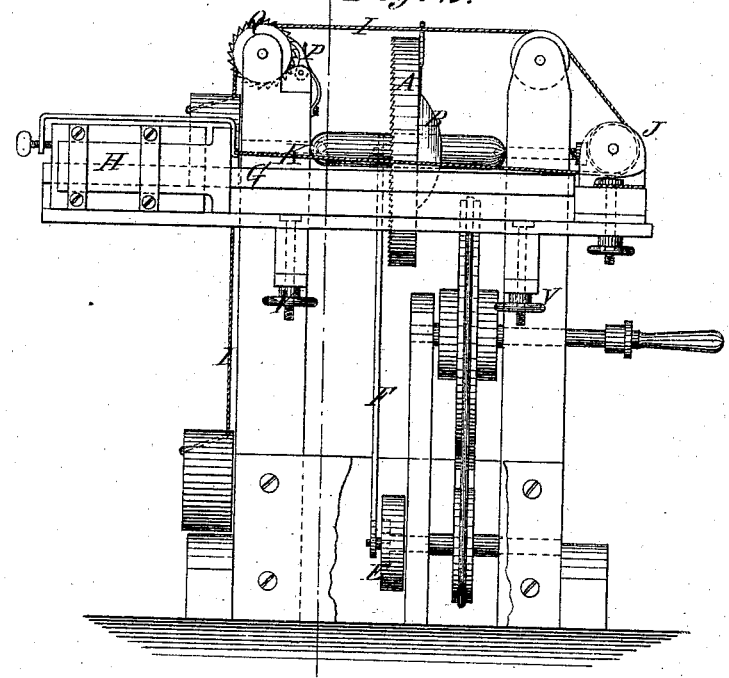
Figure 3:
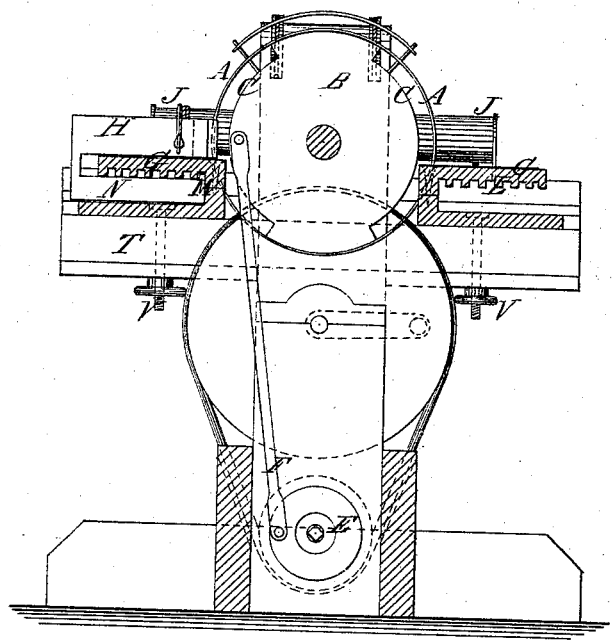

Figure 1 is a top view of my improved machine. Fig. 2 is a side elevation, and Fig. 3 is a section on line $x\ x$ of Fig. 1.

Similar letters of reference indicate corresponding parts.

A represents a band or hoop saw, either in an endless piece or in two pieces, fitted on a circular oscillating head, B, which is notched on opposite sides, at C, to make room for the staves, said head being mounted on a shaft, D, and worked by a crank-shaft, E, and connecting-rod F, or in any other approved way.

G represents the saw-tables, and H the carriages for the work, said carriages being operated to feed the saw by the weighted cords I, drums J, and cords K, and being gaged to the saw by the grooves L L in the under side of the top plate of the table, in which a guide-stud, M, of an arm, N, of the carrier works, and which is shifted toward the saw one groove each time the carriage is drawn back for another cut.

The carriages are drawn back by hand, and a ratchet-wheel, Q, and a pawl, P, are used to hold them against back movement while setting the work up to the saw. The bolts O are dogged between the ends of the carriages, which are held by the clamp S.

The feed-tables are adjustable toward and from the saw on the supports T, and are fastened by the bolts V.

The saw may be used in connection with one table only; but there is more economy in two, as one person can attend both.

Having thus described my invention, I claim as new and desire to secure by Letters Patent—

1. The combination of work-carriages H, saw-table G, weighted cord I, drum J, and cords K, substantially as specified.

2. The combination of ratchet Q and pawl P with the weighted cord I, drum J, cord K, and work-carriage H, substantially as specified.

3. The saw-tables having a series of grooves, L, in combination with a guide-stud on the work-carriage, for gaging the work to the carriage, as set forth.

BENJAMIN H. CATCHING.

Witnesses:
    S. HUGHES,
    J. S. WAGGENER.